(No Model.)
J. D. ABRAHAM.
ATTACHMENT AND COUPLING FOR WATER CLOSETS.
No. 477,485. Patented June 21, 1892.
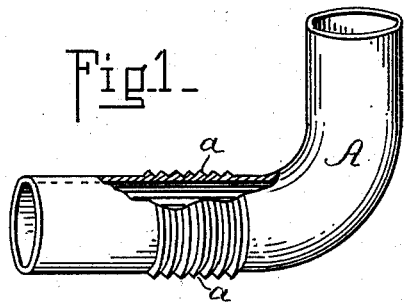
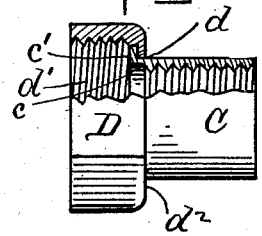
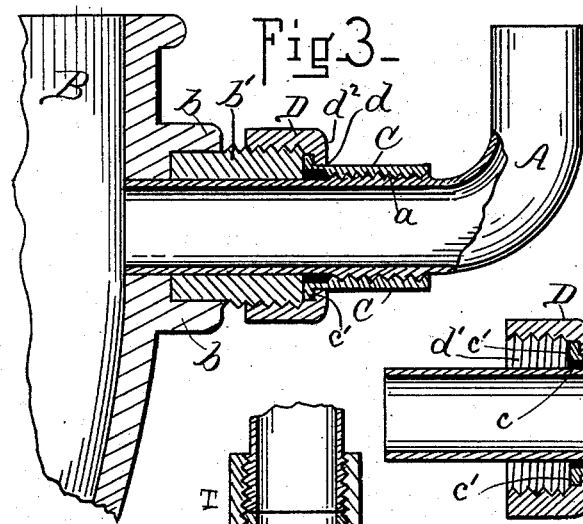
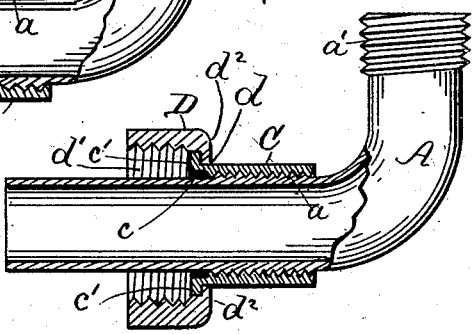
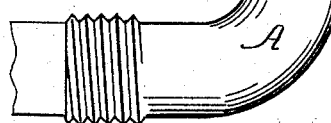
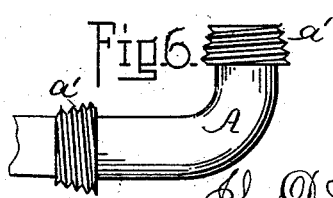
WITNESSES
Thos. Houghton.
Jam'b H. Jacobson
INVENTOR
John D Abraham
by Lewis Abraham
Attorney

UNITED STATES PATENT OFFICE.

JOHN D. ABRAHAM, OF CINCINNATI, OHIO.

ATTACHMENT AND COUPLING FOR WATER-CLOSETS.

SPECIFICATION forming part of Letters Patent No. 477,485, dated June 21, 1892.

Application filed January 2, 1892. Serial No. 416,843. (No model.)

*To all whom it may concern:*

Be it known that I, JOHN D. ABRAHAM, a citizen of the United States, residing at Cincinnati, in the county of Hamilton and State of Ohio, have invented certain new and useful Improvements in Attachments and Couplings for Water-Closets; and I do hereby declare the following to be a full, clear, and exact description of the invention, such as will enable others skilled in the art to which it appertains to make and use the same.

My invention relates to joints and couplings, and has principal reference to connections made to water-closet bowls, but is equally adaptable for application to analogous devices where pipes are united to earthenware or friable vessels into which vapor or liquid is led from a main supply.

My invention consists in a novel way of uniting sections of an elastic or yielding pipe, also in connecting such material to metallic or other rigid pipe, and in means by which the conjoined sections are adjustable to diverse distances, whereby the length of the conduit-pipe and its connections may be regulated as required, all as hereinafter described, illustrated in the accompanying drawings, and specifically pointed out in the claims.

My invention is principally adapted for application to connections with water-closet bowls, urinals, basins, and vessels made of earthenware or any friable material liable to be broken by strain or tension. The extension from members of such devices, herein called a "horn," is liable to be broken, and the whole structure is thereby rendered useless. However skilled the workman may be, it is well known that such accidents are frequent while connections are being made between ordinary earthenware and metallic members or any portions composed of materials of diverse density or rigidity. Especially is this the case where rigid elbows are employed in combination with earthenware vessels, and although the coupling may at first be apparently correct the slightest imperfection, either in workmanship or material, results subsequently in the defects pointed out. Buildings, especially new ones, frequently settle, whereby the normal lines of pipes and couplings are distorted and disarranged, causing rupture and leakage. My invention overcomes these defects by provision of an extensible elbow adjustable telescopically within bearings, as illustrated and described.

I do not claim, broadly, an elastic elbow, as I am aware that it has been used before; but previous to my improved coupling devices it has been necessary to have the horn and other parts of the bowl, elbow, and pipe peculiarly conformed. For each form now in use a separate construction is required My invention can, however, be applied to any style of bowls and basins in common use, is inexpensive, and easily adjusted by a novice or any person unskilled in the art to which it relates, and will be appreciated by mechanics employed in adjusting the devices to which it relates, and is not liable to get out of order, as is the case with the complicated devices now employed for similar purposes.

Referring to the accompanying drawings, wherein like letters of reference point out similar parts on each figure, Figure 1 represents a tubular elastic elbow, a section thereof intermediate of its length provided with threads molded thereon and integral with the material of which the elbow is composed. Fig. 2 is a detail view of a threaded sleeve adapted to intermesh with the threads on the elbow, having short smooth extension at one end, terminating with an overturned peripheral flange, also showing an interiorly-screw-threaded nut at the flanged end of the sleeve. Fig. 3 represents portions of a closet-bowl with outwardly-extending horn and attached spud, having connected thereto an elastic elbow, showing the position of the several parts when coupled according to my invention. Fig. 4 is a detailed view of an elastic elbow provided with sleeve and nut for connecting to spud, the opposite end of the elbow being threaded for connection with supply-pipe. Fig. 5 represents an elbow outwardly threaded at each end. Fig. 6 represents an elastic elbow provided with threads tapering from apex to base.

To fully illustrate the invention, portions of the several figures are broken away and parts shown in section.

A is an elbow made of rubber or any suitable yielding material; $a$, threads molded thereon and integral therewith intermediate of its length. $a'$ represents similar threads at its free end, for a purpose presently set forth. The outward dimensions of threads need not be of uniform size. For some purposes they increase diametrically from apex to base spirally, as shown in Fig. 6, whereby as the sleeve is screwed thereon considerable compression will result and a tight joint be secured, thus increasing protection against leakage. The yielding threads may taper in the manner set forth at any degree of obliquity; but no such divergence is necessary or contemplated in conformation of the rigid threads within the surrounding sleeve. This feature may be applied to the elbow at either end or at any point of its length.

B is a bowl provided with outwardly-extending horn $b$ of the usual form, having adjusted therein and outwardly reaching therefrom a threaded spud $b'$, as common in analogous devices; C, threaded tubular open-ended sleeve having short smooth extension $c$, furnished with an outwardly-overturned peripheral flange $c'$; D, nut having a smooth bore $d$, which freely turns upon the extension $c$ of the sleeve C. The lower end of said nut is hollowed and is of greater diameter than the bore $d$. The interior circumferential surface of this nut is screw-threaded, as shown at $d'$, which thread in practice intermeshes with the screw-threaded spud $b'$, as plainly shown in the drawings. The overturned upper end of this nut from the bore $d$ to its outward edge thus constitutes a flat circumferential plate or abutment $d^2$, which in practice takes against and overlies the flange $c'$. These two juxtaposing members when the nut is screwed home on the spud $b'$ will be interlocked and a complete coupling effected without risk of fracture or strain on any of the connections, the opposite end of the sleeve C surrounding the threaded section of the elastic elbow, as hereinbefore set forth.

In Fig. 5 an elbow is shown with threads at each end, whereby it may be permanently connected to a rigid pipe at either end by attachment thereon of a threaded sleeve C. In said figure a short section of metal pipe is represented at the upper end of the elbow inserted within extension of the sleeve screwed onto the threaded end of elbow. Such pipe can be permanently connected to the sleeve by soldering, riveting, or in any suitable manner. The opposite end of the elbow shown in Fig. 5 is illustrated without any sleeve or other attachments.

Fig. 3 illustrates a closet-bowl having an elastic elbow connected thereto according to my invention. It will be seen that the eduction end of said elbow extends lengthwise within the horn, whereby it will discharge direct into the bowl, and there will be no risk of leakage at any joint or member of the coupling. I deem this an important feature of my invention.

In all devices of analogous character the end of the elbow terminates at the spud and does not enter the horn, whereby the smallest tension, blow, or pressure is liable to make a fissure, and leakage will consequently occur. By insertion of a length of the discharge end of the elbow within the horn, as shown, if from any cause it should move, no such objectionable result will follow. The portion within the horn is not cemented or otherwise rigidly connected thereto. It is, as before set forth, composed of elastic material and will yield to strain or pressure either laterally or vertically. Moreover, said discharge end lies loosely within the horn, and any motion imparted to said end will not be transmitted to the horn.

Experience has demonstrated that the described location of the eduction end of the elbow is an improvement that will be appreciated by all interested in the device illustrated, as it overcomes mischief and serious defects for which a remedy has long been sought.

From the foregoing description, in connection with the drawings, the nature and object of my invention and its practice and operation will be readily understood by all skilled in the art to which it is allied.

Having thus fully described my invention and the manner of its operation, what I claim, and desire to secure by Letters Patent of the United States of America, is—

1. The within-described elastic elbow, having molded thereon and integral therewith threads $a$, and threaded sleeves C with short smooth extension $c$ and peripheral outwardly-inclined flange $c'$, in combination with nut D, having upper smooth aperture $d$ and hollowed lower portion of increased diameter interiorly screw-threaded, said threaded end adapted to intermesh with threaded spud connected to the horn of a closet-bowl, substantially as described.

2. An elastic elbow having outward threads molded upon and integral with the material of which the elbow is composed, said threads increasing in diameter spirally from apex to base, in combination with a metallic sleeve interiorly threaded, said threads being of uniform diameter the full length of said sleeve, substantially as described.

3. In water-closet attachments, an elastic elbow coupled at one end to flush-pipe by insertion of their juxtaposing ends within tubular sleeve T, adjustable telescopically therein at required distances apart, the outflow end of the elbow being inserted within horn of the bowl and adapted to be moved therein to any point of their respective lengths, in combination with flanged sleeve surrounding the elbow end and interiorly-threaded nut, the upper end of which nut surrounds the flange of said sleeve, its threaded portion being screwed home upon spud $b'$, whereby the several members are permanently connected and protected by elastic covered joints that will yield to pressure and strain from any direction, substantially as described.

In testimony that I claim the invention above set forth I affix my signature in presence of two witnesses.

JOHN D. ABRAHAM.

Witnesses:
SAML. C. BAILEY,
FREDK. SARGRO, Jr.